Sept. 22, 1964 H. W. PENMAN 3,149,988
APPARATUS AND METHOD FOR APPLYING A THERMOPLASTIC
COATING TO THE BACKING OF CARPET
Filed Feb. 23, 1962
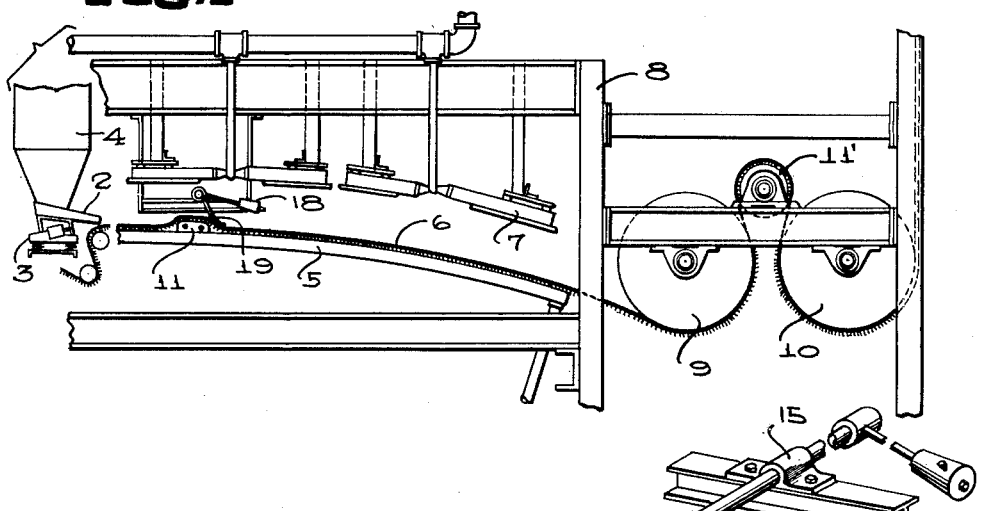
FIG.1
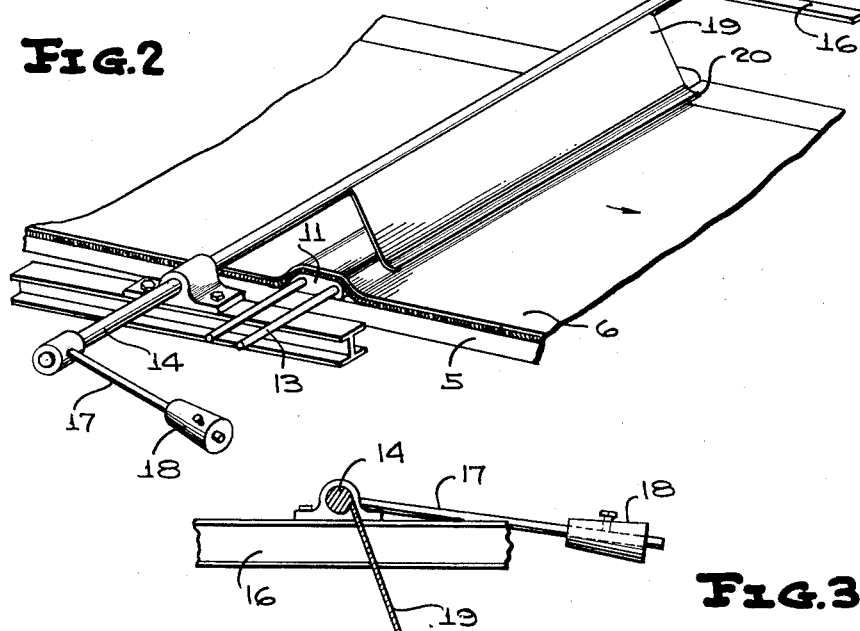
FIG.2
FIG.3
INVENTOR
HURL W. PENMAN
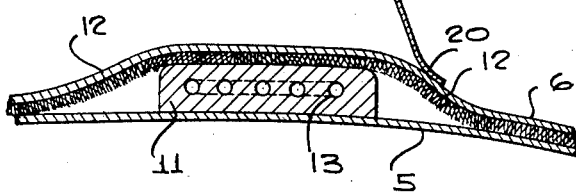
BY
ATTORNEY

United States Patent Office 3,149,988
Patented Sept. 22, 1964

3,149,988
APPARATUS AND METHOD FOR APPLYING A THERMOPLASTIC COATING TO THE BACKING OF CARPET
Hurl W. Penman, Bloomsburg, Pa., assignor to The Magee Carpet Company, Bloomsburg, Pa., a corporation of Pennsylvania
Filed Feb. 23, 1962, Ser. No. 174,979
9 Claims. (Cl. 117—21)

This invention relates to apparatus and method for applying a thermoplastic coating to the backing of carpet, such as disclosed in my prior applications Serial No. 57,291, filed September 20, 1960, and Serial No. 80,717, filed December 1, 1960.

It is an object of the present invention to incorporate in the apparatus disclosed in my prior applications means for spreading and ironing the fluid coating of plastic over the backing to provide a layer of coating in firm adhesion with the backing.

A further object of the invention resides in providing a rib across the platen for raising the carpet beneath a spreader blade so that a section of the carpet along the edge of the rib is freely suspended above the platen for yieldable movement under the pressure of the spreader blade in contact with the fluid plastic coating.

A still further object of the invention resides in providing means for raising the carpet as it passes beneath the spreader blade and means for cooling the raised pile surface of the carpet to protect the pile from damage by the heat employed to melt the plastic powder.

Other objects and advantages of the invention will be apparent during the course of the following description.

In the accompanying drawing forming a part of this specification and in which like numerals are employed to designate like parts throughout the same, FIG. 1 is a fragmentary side elevation of the coating apparatus showing the spreader applied thereto, FIG. 2 is a perspective view of the spreader, and, FIG. 3 is a cross sectional view of the elevating rib and spreader blade.

Referring to the drawing, a longitudinally curved platen 5 supports the carpet 6 as it moves along beneath the infra-red gas radiant heaters 7 supported by a frame 8. The carpet is drawn along the platen by a conventional drag roll and as it leaves the platen it passes through a pressure and chill roll assembly comprising a pair of spaced rolls 9 and 10 and a roll 11′ of smaller diameter disposed between and above the rolls 9 and 10. The carpet is disposed with the pile in contact with the platen and a thermoplastic powder such as polyethylene powder or other suitable thermoplastic material is distributed over the woven backing of the carpet before the carpet passes beneath the heaters by a feed chute 2 of a Syntron metering device 3. A hopper 4 for holding a supply of the thermoplastic powder is mounted above the feed chute 2 for supplying powder to the feed chute. As the carpet moves beneath the heaters the thermoplastic powder is reduced to a fluid state to form a coating for the backing.

The present invention comprises a rib or bar 11 mounted transversely of the platen 5 inwardly from the discharge end of the platen. The carpet 6 is trained over the rib thus elevating the carpet above the platen with the carpet along the longitudinal edges of the rib being freely suspended, as at 12, so as to be yieldable under pressure. The rib is provided with cooling pipes 13 throughout its length supplied with a suitable cooling medium which maintains the rib at a temperature to cool the pile of the carpet so it will not be damaged by the heat from the heaters.

A shaft 14 is mounted above the rib 11 and extends longitudinally thereof. The shaft is journaled for rotation in bearings 15 mounted on beams 16 suspended from the frame 8. Attached to each end of shaft 14 is a lateral arm 17 having an adjustable weight 18 mounted thereon which serve to exert a rotative force on said shaft. A spreader blade 19 is attached to and depends from the shaft being of such length as to extend the width of the carpet. The blade is inclined downwardly in the direction of the discharge end of the platen with its lower edge curved, as at 20, and in contact with the coated face of the carpet at the point where it leaves the rib and is freely suspended and yieldable under the pressure of the blade which is moved downwardly under the force of the weights 18. Thus, it is seen the spreader blade irons the fluid coat of plastic providing a smooth layer of plastic in firm adhesion with the backing of the carpet.

It is to be understood that the form of the invention herein shown and described is a preferred example of the same and changes in shape, size and arrangement of the parts may be made without departing from the spirit of the invention or scope of the claims.

Having thus described my invention, I claim:

1. Apparatus for spreading a plastic coating over the woven backing of carpet comprising a platen over which the carpet is moved with the coated backing exposed, means for maintaining the coating in a fluid state, rigid means on said platen for elevating the carpet to freely suspend a section of the carpet above the platen and means suspended above said platen having constant contact with the freely suspended section of the carpet for ironing the layer of plastic.

2. Apparatus for spreading a plastic coating over the woven backing of carpet comprising a platen over which the carpet is moved with the coated backing exposed, heaters above said platen for maintaining the coating in a fluid state, rigid means on said platen for elevating the carpet to freely suspend a section of the carpet above the platen, and a spreader blade suspended above said platen having contact with the freely suspended section of the carpet for ironing the layer of plastic.

3. Apparatus for spreading a plastic coating over the woven backing of carpet comprising a platen over which the carpet is moved with the coated backing exposed, means for maintaining the coating in a fluid state, a rib on said platen for elevating said carpet to freely suspend a section of the carpet above said platen, and a spreader blade suspended above said platen having constant contact with the freely suspended section of the carpet for ironing the layer of plastic.

4. Apparatus of the character described in claim 3 including means for cooling said rib.

5. Apparatus of the character described in claim 3 including means for applying pressure on said spreader blade.

6. Apparatus of the character described in claim 3 including means for cooling said rib and means for exerting pressure on said spreader blade.

7. Apparatus for spreading a plastic coating over the woven backing of carpet comprising a platen over which the carpet is moved with the coated backing exposed, rigid means on said platen for raising the carpet above the platen to freely suspend a section of the carpet, a spreader blade pivotally suspended above said platen with its free edge in contact with the freely suspended section of the carpet and means for exerting pressure on said blade to hold the blade in contact with the plastic coat.

8. Apparatus for spreading a plastic coating over the woven backing of carpet comprising a platen over which the carpet is moved with the coated backing exposed, rigid means on said platen for holding a section of the carpet in raised suspended relation to said platen, a rotatable shaft mounted above said platen, a blade suspended from said shaft having its free edge in contact with the raised section of the carpet, and means for exerting a rotative force on said shaft to hold said blade in contact with the coated backing of the raised section of the carpet.

9. The method of applying a plastic coating to the backing of carpet comprising the steps of applying a thermoplastic powder to the backing of the carpet, heating the plastic powder to reduce it to a fluid state, raising a section of the carpet so that it is freely suspended and then pressing and smoothing the plastic coating on the raised section.

References Cited in the file of this patent

UNITED STATES PATENTS

| | | |
|---|---|---|
| 1,909,482 | Barrett | May 16, 1933 |
| 2,092,974 | Hiers | Sept. 14, 1937 |
| 2,117,200 | Miller | May 10, 1938 |
| 2,196,692 | Bateman | Apr. 9, 1940 |
| 2,227,530 | Binns | Jan. 7, 1941 |
| 2,249,088 | Murray | July 15, 1941 |
| 2,534,320 | Taylor | Dec. 19, 1950 |
| 3,019,130 | Hornbostel | Jan. 30, 1962 |

FOREIGN PATENTS

| | | |
|---|---|---|
| 356,272 | Switzerland | Sept. 29, 1961 |